(12) United States Patent
Rai et al.

(10) Patent No.: US 8,427,452 B2
(45) Date of Patent: Apr. 23, 2013

(54) CHARGE PUMP FREQUENCY SELECTION IN TOUCH SCREEN SENSOR INTERFACE SYSTEM

(75) Inventors: Abhay Kumar Rai, Fort Collins, CO (US); Vitali Souchkov, Walnut Creek, CA (US); Jeffrey Stone, Fort Collins, CO (US)

(73) Assignee: Pixart Imaging, Inc., Hsin-Chu (TW)

( * ) Notice: Subject to any disclaimer, the term of this patent is extended or adjusted under 35 U.S.C. 154(b) by 219 days.

(21) Appl. No.: 13/149,866

(22) Filed: May 31, 2011

(65) Prior Publication Data

US 2012/0306801 A1    Dec. 6, 2012

(51) Int. Cl.
*G06F 3/045* (2006.01)
(52) U.S. Cl.
USPC .......................................... 345/174; 345/173
(58) Field of Classification Search ......................... None
See application file for complete search history.

(56) References Cited

U.S. PATENT DOCUMENTS

| 2009/0009483 | A1 | 1/2009 | Hotelling et al. |
| 2010/0097078 | A1 | 4/2010 | Philipp et al. |
| 2010/0231554 | A1 | 9/2010 | Anno et al. |
| 2011/0007028 | A1 | 1/2011 | Curtis et al. |
| 2011/0061947 | A1 | 3/2011 | Krah et al. |
| 2011/0300908 | A1* | 12/2011 | Grespan et al. ............... 455/566 |
| 2012/0050181 | A1* | 3/2012 | King et al. .................... 345/173 |

OTHER PUBLICATIONS

Preliminary Product Data Sheet entitled "AMRI-5200 Low-Power 10-Touch Controller" Apr. 20, 2011, Avago Technologies.

* cited by examiner

*Primary Examiner* — Lixi C Simpson
(74) *Attorney, Agent, or Firm* — McClure, Qualey & Rodack, LLP

(57) ABSTRACT

Various embodiments of charge pump circuitry configured to generate output signals having first distortion signals superimposed thereon are disclosed. Demodulator input signals are also disclosed that have second distortion signals superimposed thereon. A synchronization signal is delivered to demodulator circuitry through at least first and second integer divider circuits and to charge pump circuitry through at least the first integer divider circuitry such that the first and second distortion signals have frequencies that are integer divisions of the synchronization frequency.

28 Claims, 5 Drawing Sheets

CHARGE PUMP FREQUENCY SELECTION IN TOUCH SCREEN SENSOR INTERFACE SYSTEM

FIELD OF THE INVENTION

Various embodiments of the invention described herein relate to the field of touchscreen or touchpad systems, devices, components and methods.

BACKGROUND

With the growing preponderance of capacitive touchscreen sensor interfaces, high signal-to-noise ratios (SNRs) are required to provide reliable performance in the presence of various types of noise often encountered in environments where capacitive touchscreens are employed. Such noise sources include, but are not limited to, liquid crystal displays (LCDs), power supplies, and environmental or ambient noise. As a result, capacitive touchscreens are often driven by high voltage signals, which often necessities the use of an on-chip charge pump for high voltage generation. While they may often be manufactured at relatively low cost, many on-chip charge pump circuits generate undesired coherent noise that can interfere with touch detection.

What is needed is a touchscreen system, and method of operating such a system, that employs low-cost on-chip charge pump circuitry where undesired noise or distortion signals generated by the charge pump circuitry is minimized or eliminated.

SUMMARY

According to one embodiment, there is provided a capacitive touchscreen or touch panel system comprising a touchscreen comprising a first plurality of electrically conductive drive electrodes configured in rows or columns, and a second plurality of electrically conductive sense electrodes configured in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, demodulator circuitry having an input operably connected to the sense circuitry, charge pump circuitry having an output operably connected to the drive circuitry, and clock generator circuitry configured to output a synchronization signal having a clock generator frequency, wherein the charge pump circuitry generates output signals having first distortion signals superimposed thereon, the demodulator input signals have second distortion signals superimposed thereon, the synchronization signal is delivered to the demodulator circuitry through at least first and second integer divider circuits and to the charge pump circuitry through at least the first integer divider circuitry, and the first and second distortion signals have frequencies that are integer divisions of the synchronization frequency.

According to another embodiment, there is provided a method of operating a capacitive touchscreen or touch panel system comprising a touchscreen comprising a first plurality of electrically conductive drive electrodes configured in rows or columns, and a second plurality of electrically conductive sense electrodes configured in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, demodulator circuitry having an input operably connected to the sense circuitry, charge pump circuitry having an output operably connected to the drive circuitry, and clock generator circuitry configured to output a synchronization signal having a clock generator frequency, wherein the charge pump circuitry generates output signals having first distortion signals superimposed thereon, the demodulator input signals have second distortion signals superimposed thereon, the synchronization signal is delivered to the demodulator circuitry through at least first and second integer divider circuits and to the charge pump circuitry through at least the first integer divider circuitry, and the first and second distortion signals have frequencies that are integer multiples of the synchronization frequency, the method comprising operating the demodulator circuitry and the charge pump circuitry at integer divisions of the clock generator frequency.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
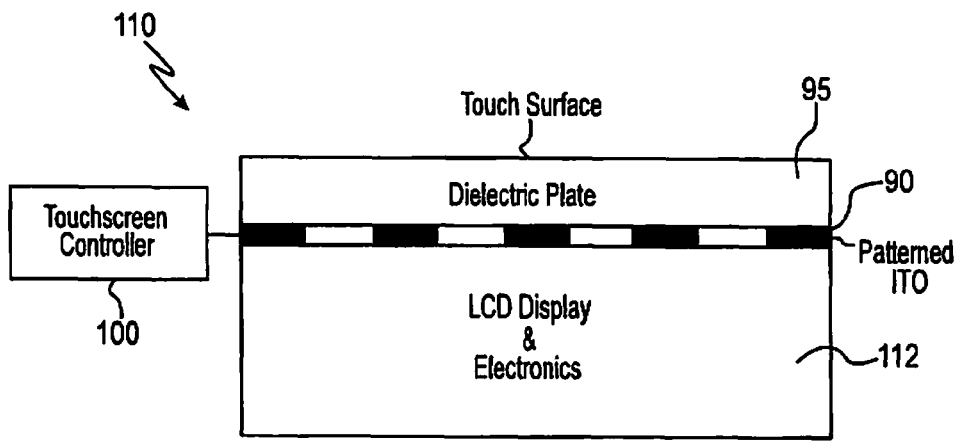
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
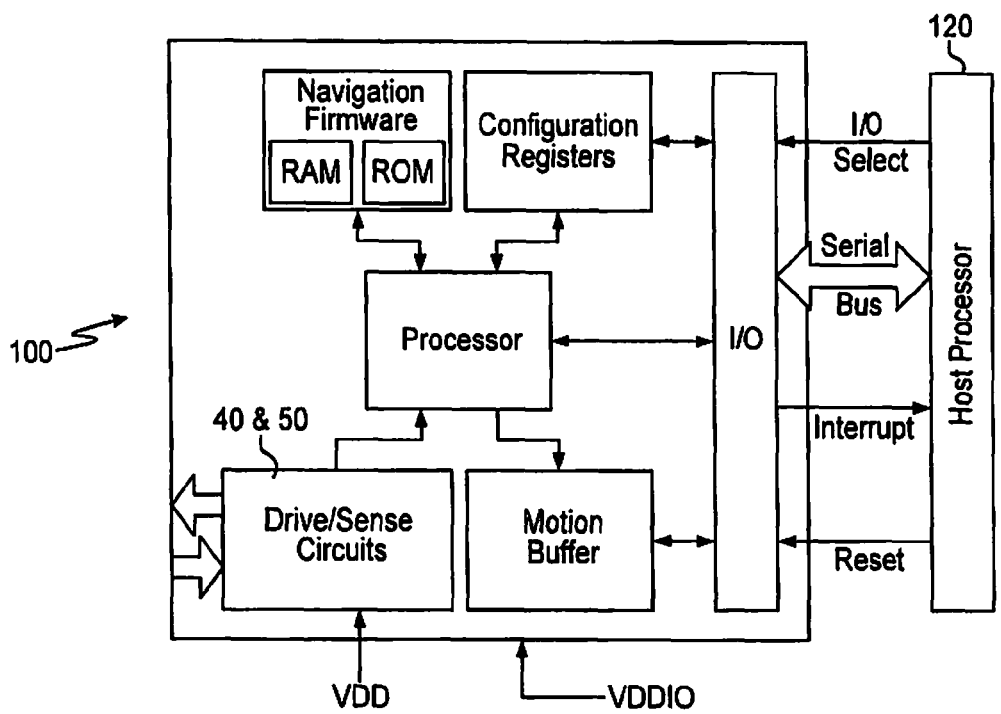
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000

ASIC or chip 100, or an Avago Technologies™ AMRI-5200 ASIC or chip 100, modified in accordance with the teachings presented herein. In one embodiment, touchscreen controller is a low-power capacitive touch-panel controller designed to provide a touchscreen system with high-accuracy, on-screen navigation.

Figure 3:
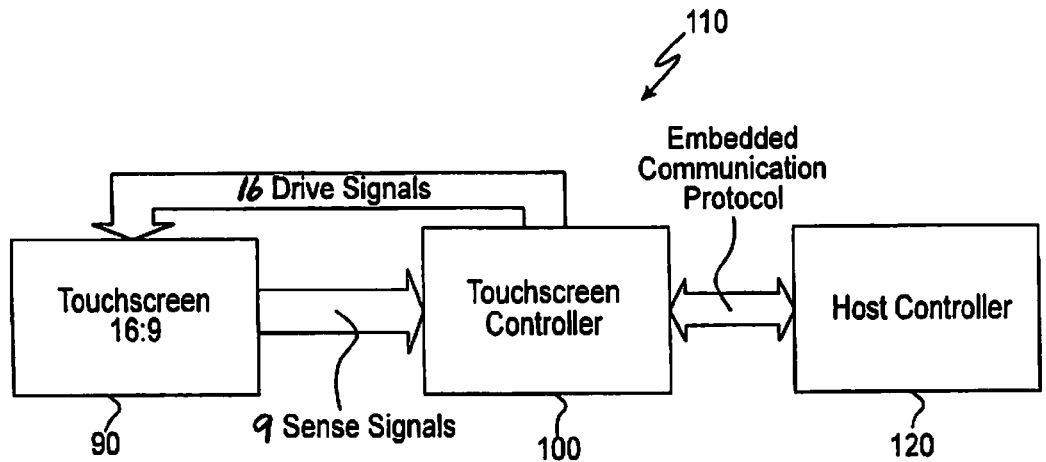
FIG. 3 shows one embodiment of a block diagram of a capacitive touchscreen system and a host controller.
Figure 4:
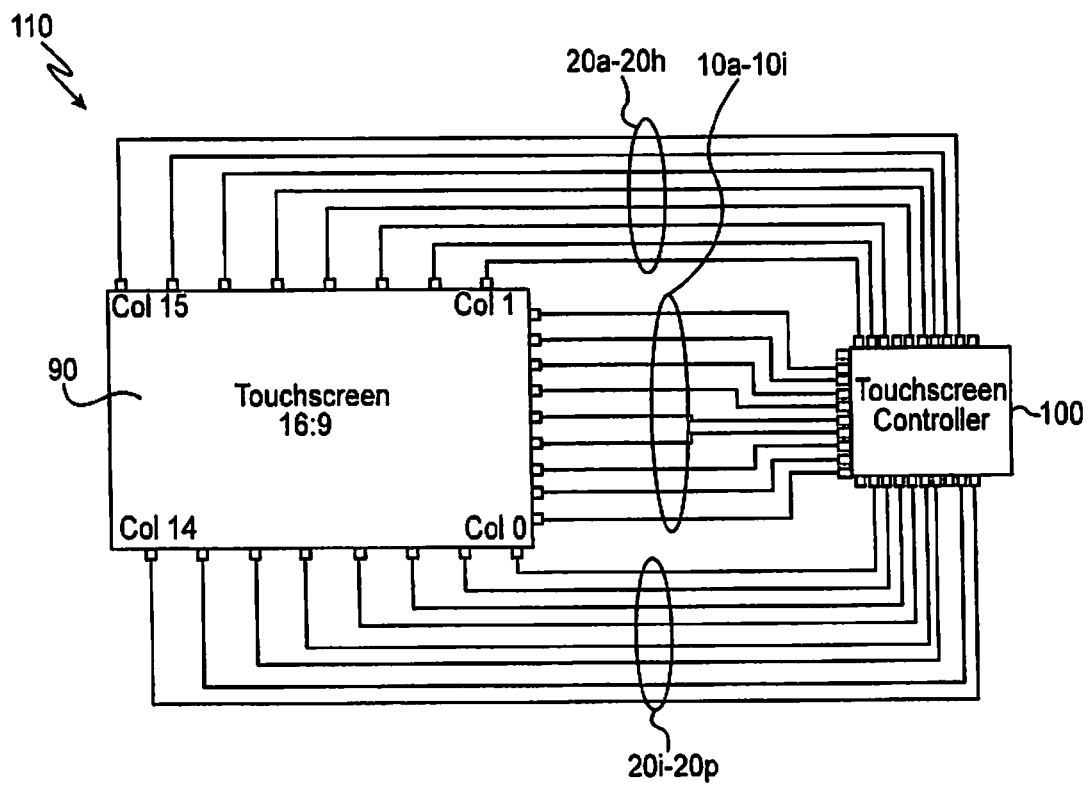
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 16 drive signal lines and 9 sense lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching touchscreen or touch panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

Touchscreen controller 100 may feature multiple operating modes with varying levels of power consumption. For example, in rest mode controller 100 may periodically look for touches at a rate programmed by the rest rate registers. There are multiple rest modes, each with successively lower power consumption. In the absence of a touch for a certain interval controller 100 may automatically shift to a lower power consumption mode. However, as power consumption is reduced the response time to touches may increase.

According to one embodiment, and as shown in FIG. 4, an ITO grid or other electrode configuration on touchscreen 90 comprises drive columns 20a-20p and sense rows 10a-10i, where drive columns 20a-20p are operably connected to corresponding drive circuits and rows 10a-10i are operably connected to corresponding sense circuits. One configuration for routing ITO or other lines from drive and sense electrodes to lines to touchscreen controller 100 is shown in FIG. 4.

Those skilled in the art will understand that touchscreen controllers, micro-processors, ASICs or CPUs other than a modified AMRI-5000 or AMRI-5200 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

Figure 5:
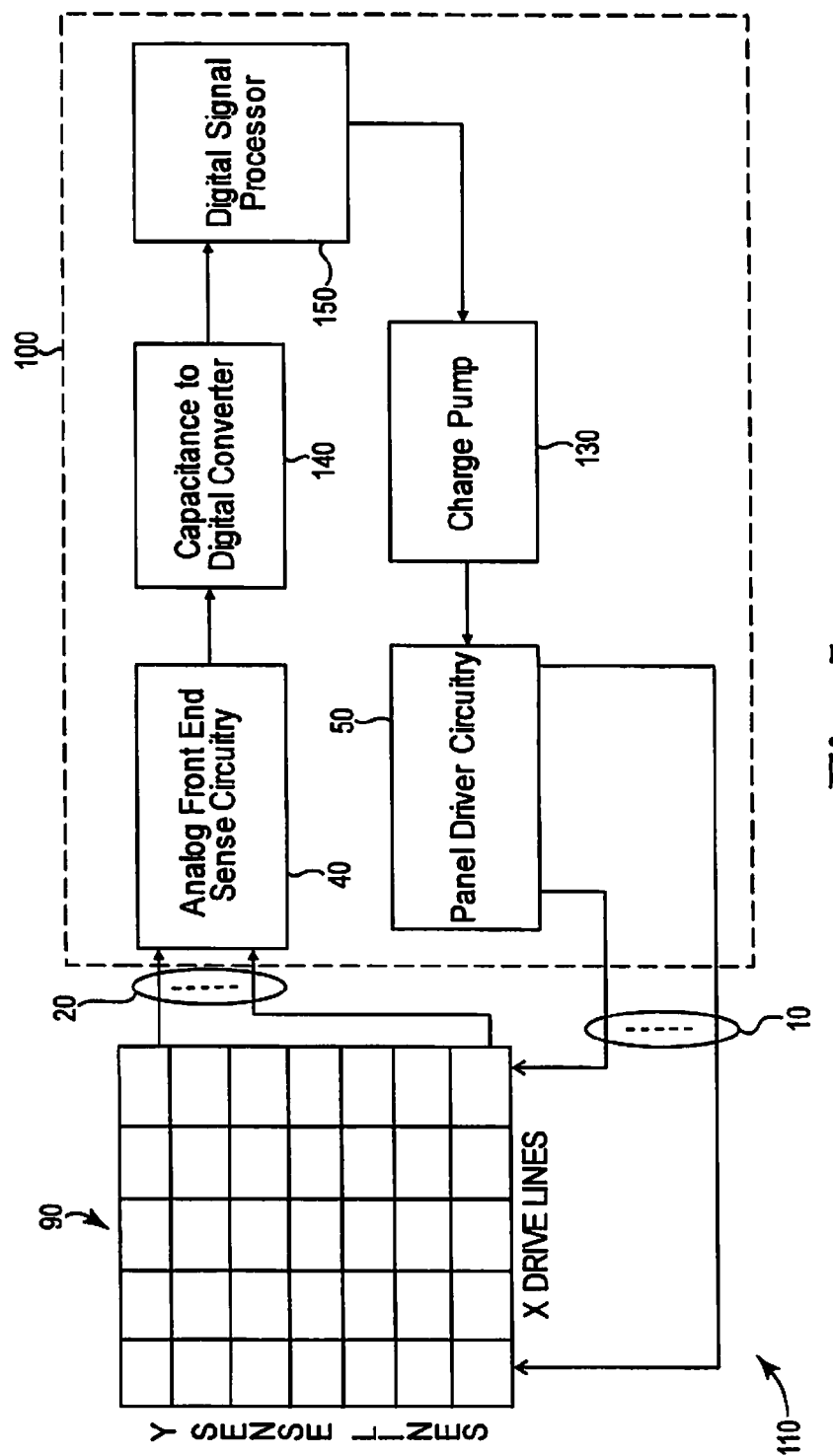
FIG. 5 shows one embodiment of a system level block diagram of touch screen sensor interface circuitry.

FIG. 5 shows one embodiment of a system level block diagram of a touch screen sensor interface. According to one embodiment, touchscreen 90 comprises an ITO pattern embedded in a glass surface having X columns of drive lines and Y rows of sense lines, where the number and density of such lines depends on navigation accuracy requirements. According to such an embodiment, and as shown in FIG. 5, panel driver circuitry 50, analog front end sense circuitry 40, charge pump 130, capacitance to digital converter 140, and digital signal processor (DSP) 150 form portions of touchscreen controller 100 and are incorporated therein. X-drive electrodes or lines 10 are driven by panel driver circuitry 50, and are preferably driven at a relatively high voltage to increase the signal-to-noise ratio (SNR) of the system. In the embodiment shown in FIG. 5, this relatively high voltage is supplied to panel driver circuitry 50 by charge pump circuit 130, which according to one embodiment is an on-chip charge pump.

Analog front end circuitry 40 comprises front end amplifiers and other circuitry to sense changes in mutual capacitance on touchscreen 90, and may also include analog filters (such as band-pass or low-pass filters). Changes in mutual capacitance sensed and processed by analog front end circuitry 40 are presented to capacitance to digital converter circuitry 140, which supplies the raw coordinates of the location and presence of a finger touching or nearly touching touchscreen 90 to digital signal processor 150, which in turn reports absolute or relative coordinates based on a touch detection method.

Continuing to refer to FIG. 5, touchscreen or touch panel 90 is driven at a fixed or variable frequency using a square wave or any other deterministic signal. The frequency of the drive signal may be fixed, or may be varied in any number of ways, including, but not limited to spread-spectrum techniques such as dithering. Any variation in frequency or phase of the drive signal is perfectly mirrored by the frequency and phase of the (usually higher-frequency) charge pump clock. In one embodiment, charge pump circuitry 130 is an on-chip charge pump which is inexpensive to manufacture, although other embodiments are contemplated, such as off-chip charge pump circuitry. According to one embodiment, output signals provided by the charge pump circuitry have ripples or distortion signals that are superimposed on the primary high voltage charge pump signal provided to drive circuitry 50.

According to one embodiment, analog front end sense circuitry 40 and/or low-pass filter 170 (see FIG. 6) include low-pass or band-pass filtering circuitry having notches that fall at multiples of the drive frequency, $f_{drive}$. The charge pump frequency is $n*f_{drive}$, where n is an integer, which may also be a filter null, to avoid charge pump switching noise being folded back into the baseband region. Thus, clocking and operation of panel drive circuitry 50 (and charge pump circuitry 130) are synchronized with clocking and operation of demodulation circuitry 160 shown in FIG. 6, where it will be seen that charge pump circuitry 130 is operably connected to clock generator 180. If the frequencies and phases of clock generator 180, charge pump circuitry 130, and demodulator circuitry 160 are not carefully selected and controlled, the operation of the touch screen sensor interface circuitry may be degraded. While SNR improvement may be realized by driving the sense lines at a high voltage, this improvement can be offset by SNR reduction arising from charge pump frequency interference. Beat frequencies have been discovered to exacerbate and complicate such problems.

Figure 6:
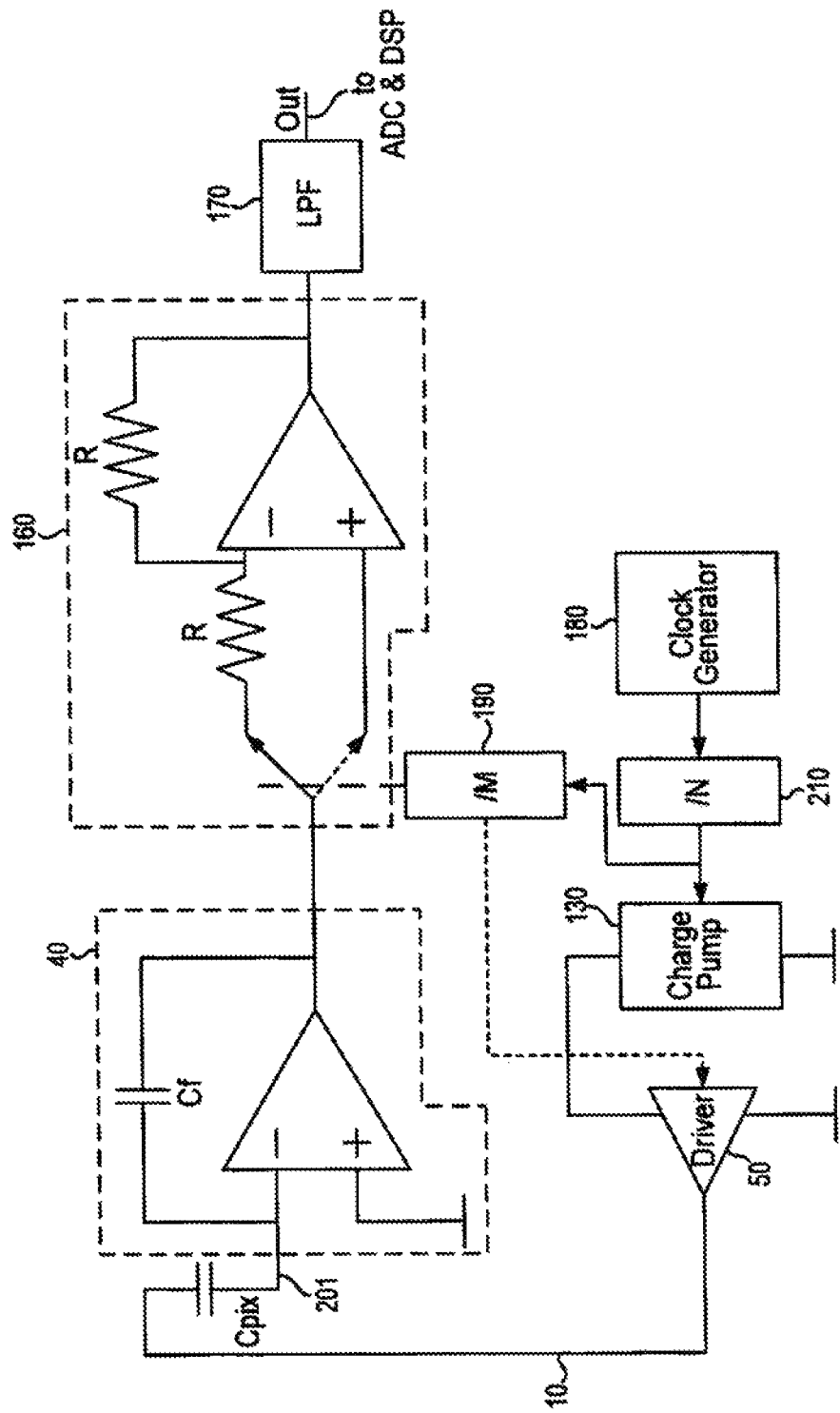
FIG. 6 shows some details and aspects of the circuitry shown in FIG. 5.

Continuing to refer to FIG. 6, there is shown one embodiment of circuitry configured to accomplish the above-described functionality. Front end sense circuitry 40 includes an integrating amplifier, which provides amplified sense signals to demodulator circuitry 160. Clock generator 180 provides synchronization signals to first divide by N circuit 210, which in turn provides output divided synchronization signals to charge pump circuitry 130 and to second divide by M circuit 190. Output divided synchronization signals provided by divide by M circuit 190 control the timing of output sense signals presented by integrated sense amplifier to demodulator circuitry 160. The frequencies of the square waves or other deterministic output signals provided by charge pump circuitry 130 and demodulator circuitry 160 are integer divisions of the synchronization signal provided by clock generator 180 according to the outputs provided by divide by N circuit 210 (in the case of charge pump circuitry 130), and the cascaded and divided outputs provided by divide by N circuit 210 and divide by M circuit 190 (in the case of demodulator circuitry 160). Thus, the primary or other square wave output signals provided by charge pump circuitry 130 and demodulator circuitry 160 are integer multiples or divisions of one another. Accordingly, the ripples or other distortion signals riding atop the primary output signals provided by charge pump circuitry 130 and demodulator circuitry 160 have known frequency and phase characteristics, and may thus be filtered out by low-pass filter 170 before the unfiltered or largely unfiltered touch signals detected by sense circuitry 40 are passed on to the analog-to-digital converter (ADC) and DSP for further processing.

Figure 7:
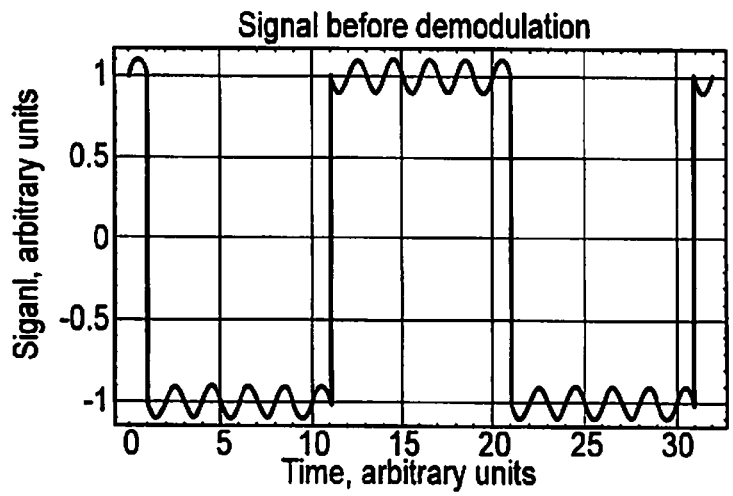
FIGS. 7 through 9 show various signals associated with the circuitry of FIG. 6.
Figure 8:
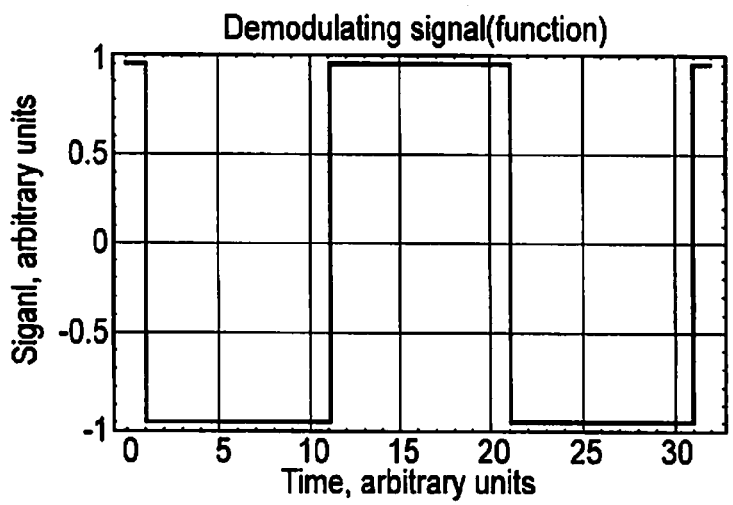
Figure 9:
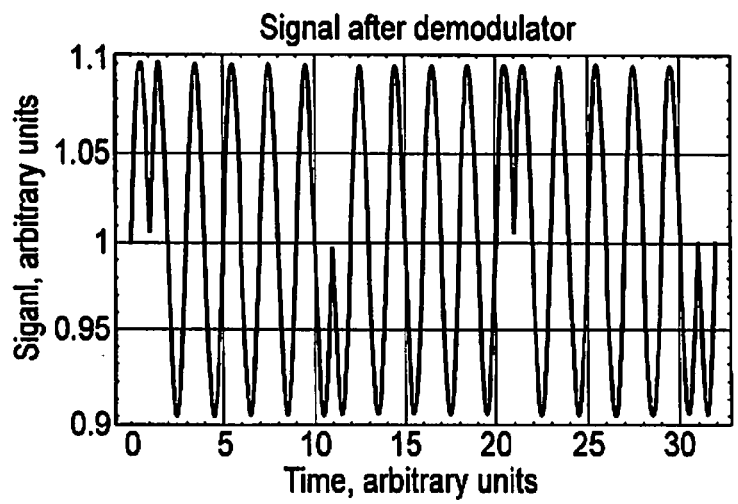

Referring now to FIGS. 7, 8 and 9, there are shown examples of signals presented to the input of demodulator circuitry 160 (FIG. 7), the demodulating signal function employed to drive demodulator circuitry 160 at a frequency 1/(N×M) of the synchronization signal output by clock generator 180 (FIG. 8), and the output signal provided by demodulator circuitry 160 presented to the input of low-pass filter 170 (FIG. 9). The signal shown in FIG. 9 is low-pass filtered by low-pass filter 170 to remove the ripples and distortion signals shown in FIG. 9, leaving the lower frequency signals corresponding to touches detected on touchscreen 90 for further processing by the ADC and the DSP (and optionally a host processor). FIGS. 7 and 9 show one harmonic of a ripple signal (or sine wave) superimposed on the primary drive signal, which is presented at the input of demodulator circuitry 160 after the capacitance sensing integrating amplifier of sense circuitry 40. In the example of demodulator circuitry shown in FIG. 6, the detected signal is multiplied by 1 or −1. A perfectly matching phase condition is shown for the example of FIG. 7. The demodulated signal presented to low-pass filter (LPF) 170 does not contribute to the low frequency part of the detected touch signal spectrum when the modulation signal period contains a consistent integer number of ripple harmonic periods. Such condition is realized by the circuitry shown in FIGS. 5 and 6 by generating drive and demodulating reference signals from a single clock generator 180 using clock frequency division as shown. As a result, the foregoing charge pump frequency selection circuits and methods prevent the degradation of signal-to-noise ratios typically associated with charge pump circuits, and especially low-cost on-chip charge pump circuits.

Thus, in the embodiments described above, charge pump circuitry 130 generates output signals having first distortion signals superimposed thereon, and sensed input signals provided to the input of demodulator circuitry 160 have second distortion signals superimposed thereon. The synchronization signal provided by clock generator 180 is delivered to demodulator circuitry 170 through at least first and second integer divider circuits 210 and 190, and to charge pump circuitry 130 through at least the first integer divider circuit 210. The first and second distortion signals have frequencies that are integer multiples of the synchronization signal provided as an output by clock generator 180.

According to various embodiments, and referring to FIGS. 5 through 9, such integer multiples may range between 1 and 1,000, and the clock generator frequency may range between about 1 MHz and about 50 MHz. The system may also be configured such that there is a substantially constant phase shift between the first and second distortion signals. In addition, DSP 150 may be operably connected to clock generator circuitry 180 to receive the synchronization signal therefrom, such as by way of a third integer divider circuitry interposed therebetween.

Various aspects of the embodiments disclosed herein are employed in the Avago Technologies® AMRI-5200 controller, for which a corresponding Preliminary Product Data Sheet entitled "AMRI-5200 Low-Power 10-Touch Controller" dated Apr. 20, 2011 was filed in an IDS on even date herewith, and which is hereby incorporated by reference herein in its entirety.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A capacitive touchscreen or touch panel system, comprising:
    a touchscreen comprising a first plurality of electrically conductive drive electrodes configured in rows or columns, and a second plurality of electrically conductive sense electrodes configured in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto;
    drive circuitry operably connected to the first plurality of drive electrodes;
    sense circuitry operably connected to the second plurality of sense electrodes and configured to sense input signals therefrom;
    demodulator circuitry having an input operably connected to the sense circuitry;
    charge pump circuitry having an output operably connected to the drive circuitry, and clock generator circuitry configured to output a synchronization signal having a clock generator frequency;

wherein the charge pump circuitry generates output signals having first distortion signals superimposed thereon, the demodulator input signals have second distortion signals superimposed thereon, the synchronization signal is delivered to the demodulator circuitry through at least first and second integer divider circuits and to the charge pump circuitry through at least the first integer divider circuitry, and the first and second distortion signals have frequencies that are integer divisions of the synchronization frequency.

2. The touchscreen or touch panel system of claim 1, wherein the integer divisions range between 1 and 1,000.

3. The touchscreen or touch panel system of claim 1, wherein the clock generator frequency ranges between about 1 MHz and about 50 MHz.

4. The touchscreen or touch panel system of claim 1, wherein there is a substantially constant phase shift between the first and second distortion signals.

5. The touchscreen or touch panel system of claim 1, further comprising a low pass filter circuit operably connected to an output of the demodulator circuitry.

6. The touchscreen or touch panel system of claim 3, further comprising an analog-to-digital converter (ADC) operably connected to an output of the low pass filter circuit.

7. The touchscreen or touch panel system of claim 6, further comprising a digital signal processor (DSP) operably connected to an output of the ADC.

8. The touchscreen or touch panel system of claim 7, wherein the DSP is operably connected to the clock generator circuitry to receive the synchronization signal therefrom.

9. The touchscreen or touch panel system of claim 8, wherein at least a third integer divider circuit is interposed between the clock generator and the DSP.

10. The touchscreen or touch panel system of claim 1, wherein the first and second distortion signals form ripples superimposed upon the charge pump output signal and the demodulator input signal, respectively.

11. The touchscreen or touch panel system of claim 1, wherein the first integer divider circuit comprises divide by N circuitry.

12. The touchscreen or touch panel system of claim 1, wherein the second integer divider circuit comprises divide by M circuitry.

13. The touchscreen or touch panel system of claim 1, wherein the charge pump circuitry is incorporated into an integrated circuit.

14. The touchscreen or touch panel system of claim 1, further comprising at least one integrating amplifier having an input operably connected to the sense electrodes and an output operably connected to the demodulator circuitry.

15. A method of operating a capacitive touchscreen or touch panel system comprising a touchscreen comprising a first plurality of electrically conductive drive electrodes configured in rows or columns, and a second plurality of electrically conductive sense electrodes configured in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, demodulator circuitry having an input operably connected to the sense circuitry, charge pump circuitry having an output operably connected to the drive circuitry, and clock generator circuitry configured to output a synchronization signal having a clock generator frequency, wherein the charge pump circuitry generates output signals having first distortion signals superimposed thereon, the demodulator input signals have second distortion signals superimposed thereon, the synchronization signal is delivered to the demodulator circuitry through at least first and second integer divider circuits and to the charge pump circuitry through at least the first integer divider circuitry, and the first and second distortion signals have frequencies that are integer divisions of the synchronization frequency, the method comprising:

operating the demodulator circuitry and the charge pump circuitry at integer divisions of the clock generator frequency.

16. The method of claim 15, wherein the integer divisions range between 1 and 1,000.

17. The method of claim 15, wherein the clock generator frequency ranges between about 1 MHz and about 50 MHz.

18. The method of claim 15, wherein there is a substantially constant phase shift between the first and second distortion signals.

19. The method of claim 15, further comprising operably connecting a low pass filter circuit to an output of the demodulator circuitry.

20. The method of claim 19, further comprising operably connecting an analog-to-digital converter (ADC) to an output of the low pass filter circuit.

21. The method of claim 20, further comprising operably connecting a digital signal processor (DSP) to an output of the ADC.

22. The method of claim 21, further comprising operably connecting the DSP to the clock generator circuitry to receive the synchronization signal therefrom.

23. The method of claim 22, further comprising interposing at least a third integer divider circuit between the clock generator circuitry and the DSP.

24. The method of claim 15, further comprising the first and second distortion signals forming ripples superimposed upon the charge pump output signal and the demodulator input signal, respectively.

25. The method of claim 15, further comprising providing the first integer divider circuit as divide by N circuitry.

26. The method of claim 15, further comprising providing the second integer divider circuit as divide by M circuitry.

27. The method of claim 15, further comprising incorporating the charge pump circuitry into an integrated circuit.

28. The method of claim 15, further comprising providing at least one integrating amplifier having an input operably connected to the sense electrodes and an output operably connected to the demodulator circuitry.

* * * * *